Figure 1:
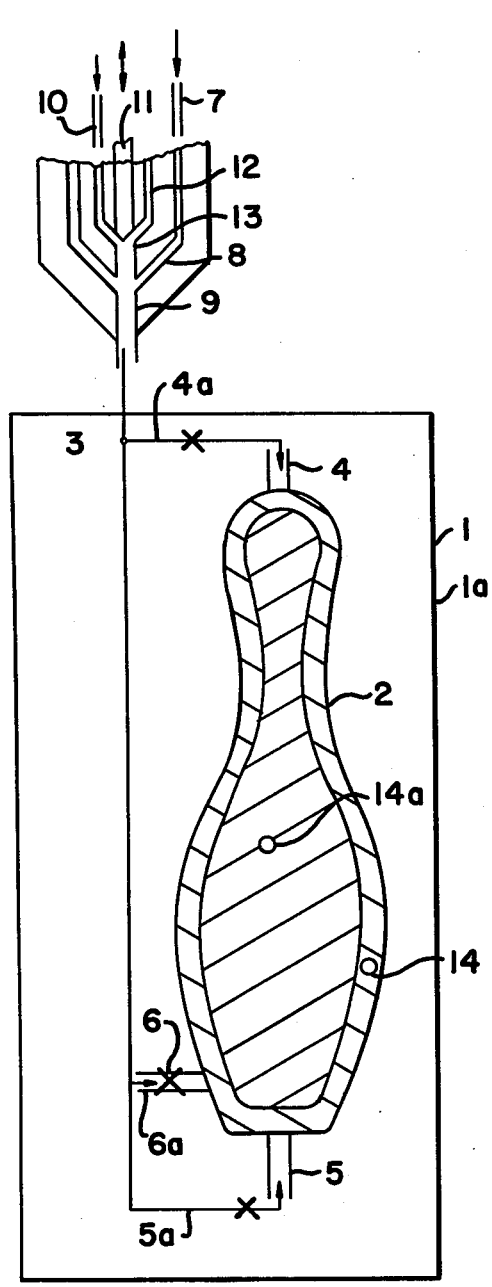

United States Patent [19]

Witkowski

[11] Patent Number: 4,457,511
[45] Date of Patent: Jul. 3, 1984

[54] PLASTIC BOWLING PIN AND METHOD OF MAKING THE SAME

[76] Inventor: William Witkowski, 909 Troupe Rd., Harborcreek, Pa. 16421

[21] Appl. No.: 358,339

[22] Filed: Mar. 15, 1982

[51] Int. Cl.³ .................. A63B 63/00; B29D 27/00
[52] U.S. Cl. ............................ 273/82 R; 264/45.1; 264/DIG. 83
[58] Field of Search ............... 273/82, 82 R, 82 A, 273/82 B; 264/45.1, DIG. 83

[56] References Cited

U.S. PATENT DOCUMENTS 3,971,837  7/1976  Hasegawa ............... 273/82 R X
4,134,687  1/1979  Eckardt ..................... 264/45.1

FOREIGN PATENT DOCUMENTS 641073  5/1962  Canada ......................... 273/82 R Primary Examiner—George J. Marlo
Attorney, Agent, or Firm—Ralph Hammar

[57] ABSTRACT

An injection molded bowling pin with a core of thermoplastic plus a blowing agent and a solid skin of thermoplastic per se injected into the mold at one and the same time. The bowling pin is molded by a process wherein a foam material for forming the core is surrounded by and in contact with a nonfoam material and both materials are simultaneously injected into a mold cavity having the shape of a bowling pin. The skin and core may be of the same or of different thermoplastic. The bowling pin is a unitary structure of superior strength and finish with the foamed core and solid skin fused together.

9 Claims, 3 Drawing Figures

PLASTIC BOWLING PIN AND METHOD OF MAKING THE SAME

This invention is intended to produce an improved bowling pin by injecting the plastic skin and a core of foam plastic at one and the same time. By coinjection, a unitary structure of superior strength and surface finish is produced with the core and skin fused together.

Figure 3:
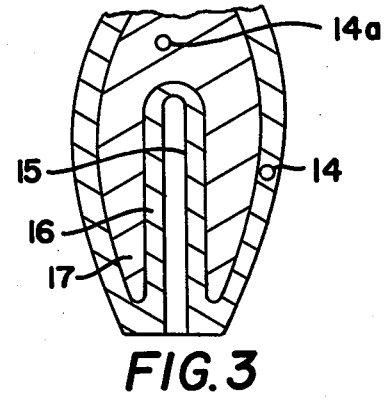
Figure 2:
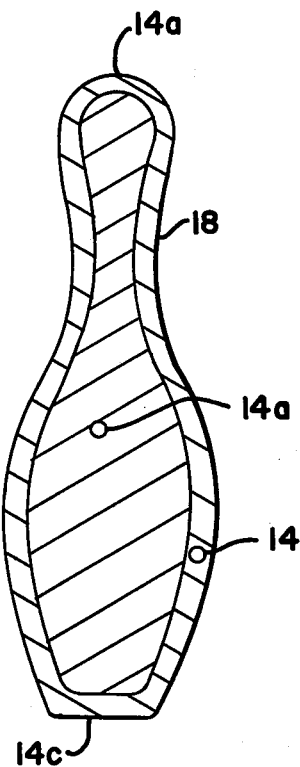

In the drawing,

FIG. 1 is a diagrammatic section through a mold and the plastic injection equipment for making bowling pins, FIG. 2 is a section through a bowling pin molded by the equipment shown in FIG. 1, and FIG. 3 is a section of a modification.

The mold shown in FIG. 1 is gated for injection at the top, bottom and at one side of the bowling pin and has a suitably valved runner system permitting simultaneous injection through one or more gates. These and other variations will become obvious as the FIG. 1 mold is described.

Bowling pins are made to specifications governing the size and weight. It is also desirable that the pins have the same physical properties in all directions, so that the movement of the pins does not depend upon the orientation of the pins. It is also desirable that the bowling pins have a smooth surface which is not dented by impact with bowling balls and other pins. This invention is intended to meet all of the foregoing requirements by a bowling pin produced by injection of a thermoplastic skin and a foam core at one and the same time. The plastics should be impact resistant, such as polypropylene, polyethylene, polycarbonate (LEXAN TM), ionomer (SURLIN TM), ABS, etc. The core and skin may be the same or different plastics.

FIG. 1 shows a mold 1 having a cavity 2 for a bowling pin. The mold is split in a plane through the vertical axis of the bowling pin, and FIG. 1 shows one half of the mold removed and the other half 1a of the mold remaining in place. The mold part 1a has gates 4, 5, 6 through which hot, viscous thermoplastics may be injected. Although more than one of the gates may be used at the same time, good results have been obtained by injecting only through gate 4 at the top of the pin, as hereafter described.

A way 7 carrying hot, viscous thermoplastic enters the gate 4 through a conical distributing way 8 converging toward the upper end of an injection nozzle 9 discharging at 3 into a runner system comprising runner 4a feeding the gate 4, runner 5a feeding gate 5 and runner 6a feeding gate 6. Each runner has a shut-off valve indicated by the letter X. When injection is to be solely through gate 4, only the valve for runner 4a is open. The thermoplastic entering the way 7 is controlled as to flow and as to temperature and pressure by conventional apparatus, not shown. Also discharging to the nozzle 9 is a mixture of hot, viscous thermoplastic plus a foaming agent which enters a way 10 and flows through a conical distributor 12 feeding the upper end of a nozzle 13 coaxial with the conical distributor 8 and nozzle 9. Flow through the nozzles 9 and 13 is controlled by a valve member 11 shown in its uppermost position where plastic flows through both distributors 12 and 8. As the valve member is lowered, it first reaches a position blocking the flow through the distributor 12 of the mixture of thermoplastic and foaming agent. As the valve member is further lowered, flow through both distributors 8 and 12 is blocked. As the valve 11 is raised from its lowermost position, distributor 8 is first unblocked, starting the flow of thermoplastic through the nozzle 9. As the valve 11 is further raised to uncover the distributor 12, the mixture of thermoplastic and foaming agent starts to flow through nozzle 9, this being in addition to the flow of thermoplastic previously started.

When the valve member is in its uppermost position as shown, and the valves in runners 5a and 6a are shut off, the mixture of viscous thermoplastic and foaming agent controlled as to temperature and pressure flows down through the way 10 and enters the center of the upper end of the nozzle 13. At this stage, the mixture is hot and decomposition of the foaming agent has started, generating fine bubbles throughout the mixture which cannot expand because the mixture is confined under pressure. The nozzle 13 is opened after the flow of the thermoplastic per se has been started through the nozzle 9 from the way 7 so that the mixture of thermoplastic and foaming agent enters the center of the stream of thermoplastic flowing through the nozzle 9 and is injected into the runner 4a and gate 4 as a core 14a of plastic plus foaming agent surrounded by a skin 14 of plastic alone.

When the injection pressures and temperature, etc. are properly controlled, there is no mixing of the plastic-foaming agent mixture with the skin of plastic per se in the nozzle 9, in the runner 4a (or 5a, 6a) in gate 4 (or 5, 6) or in the mold cavity. The skin and core are distinct materials which are brought into conforming contact while the materials are in the viscous state and are cooled to the solid state while the contact is maintained so the core and skin are fusion bonded or welded together and become structurally integral. Once the stream of plastic plus foaming agent enters the mold cavity, it expands due to the expansion of the gases of the foaming agent, and the skin of plastic is blown outward by the gases which cause the foaming of the plastic in the core. Before the mold cavity is completely filled, the flow of plastic plus foaming agent is cut off and the final injection is of plastic alone, which results in the closed top 14b for the bowling pin. The closed top 14b corresponds to a closed bottom 14c resulting from the initial injection of plastic alone.

When the cooling of the mold is sufficient to maintain the structural integrity of the pin, the mold is opened and the pin is ejected and is further cooled by immersion in water, by fans, or by any other cooling means. Because of the large volume to be cooled, the final cooling of the bowling pin requires considerable time.

In FIG. 3, in the base of the pin there is a reentrant cored opening 15 surrounded by a skin of solid plastic 16 and an annular section 17 of foamed plastic. The cored opening provides additional surfaces for removing heat from the pin during molding. In other respects, the construction is the same as in FIGS. 1 and 2.

Bowling pins, hard maple or plastic, usually break at the neck 18, the region of minimum diameter. The breakage often shows up when the pinsetting machine is setting up a "spare" of one or more pins on one side of the lane. Pin breakage is frequent enough to be a major expense item for bowling lanes. To reduce pin breakage, the shock resistance of the neck may be increased by making the skin 14 of a tougher plastic, such as ionomer (SURLIN TM) and/or the thickness of the skin may be varied.

The skin 14 need not be of substantially uniform thickness throughout, as illustrated. Pins in which the skin at the region 18 of the neck are so thick as to almost meet at the center are so strong that breakage is essentially impossible during years of continuous use. The thickening of the skin in region 18 eliminates the need for making the skin of tougher plastic.

The coinjection of plastic and plastic plus a foaming composition provides a smooth exterior surface for the bowling pin without any bubbles, which decreases the finishing costs. While the plastic alone and the plastic with the added foaming composition do not mix while being injected into the mold, the two compositions are set up together and are firmly knit at the adjoining boundaries so that mechanically there is no problem of delamination, such as might occur if the core were first molded, then the premolded core inserted in another mold where the skin was injected around the core.

By changing the shape of the mold cavity, duckpins, tool handles, baseball bats, hockey sticks, water skis and golf club heads can be molded. Other modifications may be made.

While I have illustrated and described preferred embodiments of my invention, it is to be understood that I do not limit myself to the constructions herein disclosed and that various changes and modifications may be made within the spirit of the invention as defined in the appended claims.

I claim:

1. A bowling pin having a central core of a mixture of thermoplastic and a foaming agent surrounded by a hollow discrete skin of thermoplastic per se, and having been made by a process wherein both the core mixture and the thermoplastic per se are coinjected while in conforming contact and while the thermoplastics are in a heated and viscous state and coinjected under pressure in a mold cavity having the shape of a bowling pin, the outer surface of the thermoplastic per se being in contact with the mold cavity and the outer surface of the mixture being in contact with the inner surface of the thermoplastic per se, the thermoplastic per se and mixture being distinct materials which are united at the surfaces which are pressured into contact while the thermoplastics are in the viscous state and which become joined into a unitary rigid body upon cooling.

2. The structure of claim 1 in which the pin is initially cooled in the mold until the skin is dimensionally stable and then further cooled outside the mold.

3. The structure of claim 1 in which the skin covers the sides of the pin and at least one end.

4. The bowling pin of claim 1 in which the thermoplastic in the skin is different from the thermoplastic in the core.

5. The bowling pin of claim 1 in which the thermoplastic of the skin and of the core is polypropylene.

6. The pin of claim 1 in which the base of the pin has an upwardly extending reentrant opening surrounded by said skin of thermoplastic per se and an annular section of said foamed thermoplastic.

7. The structure of claim 1 in which the pin has a small diameter neck at its upper end and the skin is thicker at the neck.

8. The structure of claim 1 in which the pin has a small diameter neck at its upper end and the upper end of the neck is formed by injection of thermoplastic alone.

9. The structure of claim 1 in which the pin has a small diameter neck at its upper end and the skin of thermoplastic per se is thicker at the neck than on the remainder of the pin.

* * * * *